United States Patent [19]
Morag et al.

[11] Patent Number: 5,343,311
[45] Date of Patent: Aug. 30, 1994

[54] INDEXED PROCESSING OF COLOR IMAGE DATA

[75] Inventors: Guy Morag, Sunnyvale; Jacob Aizikowitz, Cupertino; Efraim Arazi, San Francisco, all of Calif.

[73] Assignee: Electronics For Imaging, Inc., San Mateo, Calif.

[21] Appl. No.: 868,728

[22] Filed: Apr. 14, 1992

[51] Int. Cl.⁵ .................... H04N 1/46; G03F 3/08; G03F 3/10
[52] U.S. Cl. .................... 358/518; 358/500; 358/501; 358/504; 358/521; 358/523; 358/524; 358/527; 358/530
[58] Field of Search ............... 358/500, 501, 504, 518, 358/521, 523, 524, 527, 530

[56] References Cited
U.S. PATENT DOCUMENTS

| | | | |
|---|---|---|---|
| 4,464,677 | 8/1984 | Kuhn et al. | 358/75 |
| 4,668,980 | 5/1987 | Stansfield et al. | 358/80 |
| 4,805,013 | 2/1989 | Dei et al. | 358/519 |
| 4,829,370 | 1/1989 | Mayne et al. | |
| 4,929,978 | 5/1990 | Kanamori et al. | 358/80 |
| 4,929,979 | 5/1990 | Kimoto et al. | 358/518 |
| 4,975,861 | 12/1990 | Fujimoto | |
| 5,130,935 | 7/1992 | Takiguchi | 364/526 |

OTHER PUBLICATIONS

Journal of Imaging Technology, vol. 16, No. 1, Feb. 1990, USA, pp. 11–21, Quantization of Color Images Based on Uniform Color Spaces.

*Primary Examiner*—Edward L. Coles, Sr.
*Assistant Examiner*—Kimberly A. Williams
*Attorney, Agent, or Firm*—Blakely, Sokoloff, Taylor & Zafman

[57] ABSTRACT

A method and apparatus for efficiently handling, modifying, transmitting, re-displaying and storing color images. An image is provided which has a plurality of pixels each having color parameters (information) in the form of color coordinates which can be considered a color point in a color space. The invention provides a plurality of color volume elements which together contain at least a portion of the color space and which in effect quantize the color space. Each color volume element has a representative color value (point) so that a first plurality of representative color values (points) are provided by the plurality of volume elements. A representative color value is determined for each pixel in the image such that, with a typical image, a subset of the first plurality of representative color values are determined. In other words, the image will not use all the values in the first plurality of representative color values. An index value is also provided for each pixel in the image, where each index value represents a particular representative color value in the subset of the first plurality of representative color values. The image may then be modified by modifying the representative color values in the subset of the first plurality of representative color values. The image, as modified, may be displayed by using the index value for each pixel. The invention includes a processor for determining the representative color values for each pixel and a memory for storing the representative color value for each pixel.

52 Claims, 10 Drawing Sheets (PRIOR ART)

INDEXED PROCESSING OF COLOR IMAGE DATA

FIELD OF THE INVENTION

The present invention relates to the field of processing, storing, and displaying the color information of an image. More specifically, the present invention relates to a method and apparatus for improved processing speed, faster re-display and reduced storage size of the color information of an image.

BACKGROUND OF THE INVENTION

The use of color images in computer systems is becoming increasingly widespread as computing power has increased and as computer users have become more sophisticated. The use of color images, however, is not limited to professionals using high-end computer systems and, instead, is quickly becoming a standard feature of personal computers as used by all levels of computer users.

With today's technology, providing realistic color imaging has numerous difficulties. Color display screens are capable of rendering a wider range of colors than can be rendered by color printers because printers are limited by the color inks and paper used in them. This discrepancy between color display screens and color printers is addressed in different ways. With the Cachet TM software, developed and marketed by the assignee of the present invention, two alternate techniques are used. In both, the particular printer, printer inks and paper are pre-characterized and incorporated into the system. In one method, the display screen is calibrated to accurately display the original image, and the printer, inks and paper characterizations are used to ensure the output print matches the display screen. In the second method, a previously printed image, known to print accurately, is displayed as a reference image on the computer display screen near a display of the original image. In this way, without needing the display screen to be accurately calibrated, the user can make corrections to the original image by matching its colorings to those of the reference image. The printer, inks and paper characterizations are then used to ensure that the output colorings match that of the reference image print.

Another difficulty with providing realistic color imaging on computer display screens is the considerable computing power required to manage the large amount of information which an electronic color image contains. In particular, many applications would benefit from interactive processing of the image information so that any changes made on the image are seen almost instantaneously (after the changes) on the display screen. This requires a large amount of computing power.

FIG. 1a depicts a typical in, age 101 comprised of picture elements, called pixels, arranged into rows and columns. These pixels together make up the image as displayed on a visual display screen. Each pixel of the image contains, among other information, the color information for that particular pixel.

The color information for the pixels in an image can be defined in a number of different ways. If the image is to be displayed on a typical raster scanned display screen, it is common in the art to use what is known as an RGB scheme whereby each pixel's color information is defined as having some quantity of each of the additive primary colors Red, Green and Blue. If the display screen uses a cathode ray tube (CRT) then the RGB values are converted to voltages which drive the CRT guns so that the RGB values represent the intensities of the red, green, and blue guns, respectively, of the CRT. Other representation schemes include 1) the CMYK scheme, whereby each pixel's color information is defined as having some quantity of each of the subtractive primary colors cyan, magenta and yellow, and of the color black; 2) the HSB scheme where each pixel's color information is defined in quantities of hue, saturation, and brightness; and 3) colorimetric schemes where each pixel's color information is defined by luminance and chrominance. Colorimetric mathematical means of specifying color include the CIE-LAB (or CIE-L*a*b*), the CIE-LUV, the CIE-XYZ and the CIE-xyz. CIE denotes the Commission Internationale de l'Eclairage, while the following three letters refer to the three coordinates used to define the color information. Because three-dimensional space can be defined by coordinate systems having three variables, the different mathematical means for describing color define different color spaces where each color can be considered a point in color space. FIG. 2 shows such a color space, in this case the HSB space, where the color values used to define any point in the color space shown are hue, saturation and brightness or brilliance.

In a digital computer system, to represent the color information in each pixel of an image, it is necessary to use a finite integer usually represented by a finite number of bits. For example, it is common in a digital computer system using an RGB scheme to use 8 bits for each of the three colors red, green and blue for each pixel. Shown in FIG. 1b is a representation 103 of the RGB color information for each pixel as it might be stored in some data storage medium. Using 8 bits for each of three colors for each pixel can result in $2^{24}$ (almost 17 million) different colors per pixel.

As image size or resolution or both increase so does the number of pixels to be displayed on the display screen. Increasing the number of pixels increases the amount of color information which must be kept for the entire image. Using an RGB 24-bits-per-pixel scheme with ever increasing image sizes results in greater file sizes for images which thus takes up more storage space and also takes more time when transferring images between computers or storage mediums.

Furthermore, whenever the user of an image wishes to alter or modify the color information for that image, each affected pixe's color information must be recalculated before the change can be saved or displayed on the computer display screen. Due to the large number of pixels in an image and the large amount of color information per pixel, the number of calculations needed to be made can become quite large. The large number of these calculations necessary to make changes to the color information of an image can thus considerably slow down the speed at which a computer system can alter and save or re-display on the display screen a color image. This delay to calculate and re-display on the display screen modifications to color images can quickly become unacceptable. This is especially a limitation when the user of a computer is interactively processing the color image. In interactive processing, the user makes a change and the computer acts on the change and often the user makes changes to the color image based on the results of previous changes as shown on the display. For this, a close to instantaneous display of changes on the display screen is desired (because the user will want to see the result of a current change which will determine future changes) which is made difficult when the amount of information to be processed is large.

As is well known in the art, there are processing speed and other advantages to working in one color space over another color space, depending upon the computations to be performed. For example, it is common to use the RGB scheme when the image is to be displayed on a computer video (CRT) display, while there are advantages to specifying colors in a perceptually (and substantially) uniform color space such as the CIE-LAB space when performing shifts in color cast. Transformations that convert from one color space to another are well known in the art. However, converting from one color information scheme to another color information scheme does not substantially reduce the amount of information which must be processed and kept for each pixel in an image. A reduction in the amount of color information which must be kept for each pixel is needed in order to substantially reduce the amount of digital data in an image and to substantially reduce the number of calculations which must be made whenever the user wishes to alter the color of an image. Together with this reduction of amount of color information, processing methods and apparatus are needed to handle the color information in the reduced form.

In order better to describe the invention and its relation to the prior art, the following terms are defined at the outset:

Appearance Values—Values produced by any reversible transformation of RGB. Luminance/chrominance (CIE-LAB) and hue, and saturation and brightness (FISB) are two common sets.

Brightness—That aspect of a colored stimulus relating to its intensity.

Hue—That aspect of a colored stimulus relating to its color name.

Saturation—That aspect of a colored stimulus relating to its purity or absence of contamination with white.

Chrominance—That aspect of a colored stimulus relating to its hue and saturation.

Color—The specification of a colored stimulus requiring at least three component values.

Color Space—A three-dimensional space in which each point corresponds to a color, including both luminaries and chrominance aspects. RGB forms such a space. HSB forms a set of cylindrical coordinates in color space. CIE-LAB The B-axis is the diagonal of RGB space, so that B=0 in HSB where R=G=B=0 in RGB, and B=max (the maximum value) in HSB where R, G, and B are max. The three components $L^*$, $a^*$ and $b^*$ in the CIE-LAB space are such that equal increments in $L^*$, $a^*$ and $b^*$ are approximately equally perceptible. Luminance $L^*$ is a non-linear transformation of brightness. The $a^*$-$b^*$ plane is perpendicular to the $L^*$-axis. The hue (angle) and chrominance (amplitude) are polar coordinates in the $a^*$-$b^*$ plane. The Munsell color space has coordinates hue, value and chroma, where hue is specified in a non-mathematical way.

Colorimetric color space—A mathematical color space including the CIE-LAB (or CIE-L*a*b*), the CIE-LUV, the CIE-XYZ and the CIE-xyz. CIE denotes the Commission Internationale de l'Eclairage, while the following three letters refer to the three coordinates used to define the color space.

Colorants—Inks or dyes as used for printing. The density of colorants is approximately proportional to the quantity of ink laid down. CMYK refer to the densities of cyan, magenta, yellow, and black ink normally used in printing.

Display—In this invention, the verb "to display" is general and for example includes both displaying on a display screen and displaying (printing) on a hard copy device.

Gamut—The range of colors reproducible with a set of inks, lights, or other colorants. The gamut can be conveniently described in terms of a particular region of a color space.

Uniform color space—A color space where color differences of color points that have equal Euclidean distance between them are approximately equally perceptible. The CIE-LAB (or CIE-L*a*b*) and the CIE-LUV are uniform mathematical color spaces, while the Munsell color space is a non-mathematical uniform color space.

SUMMARY OF THE INVENTION

One objective of the present invention is to provide an improved method for handling color information of an image.

Another objective of the present invention is to provide an improved apparatus for handling color information of an image.

These and other objects of the present invention are provided for by a method of handling an image comprised of a finite number of pixels containing color information wherein the method comprises the steps of taking the color information of each pixel, such information represented by the coordinates of a point in a color space, and assigning to each pixel an index to the coordinates of a representative color point in a volume element defined in the color space where the volume element also contains the pixel's color point. Each unique color point in the color space of the invention represents a unique color value (having typically three coordinate values, such as $L^*$, $a^*$ and $b^*$) in the color space.

These and other objects of the present invention are also provided for by an apparatus for handling an image comprised of a finite number of pixels containing color information wherein the apparatus comprises a means for taking the color information of each pixel, such information represented by the coordinates of point in a color space, and assigning to each pixel an index to the coordinates of a representative color point in a volume element defined in the color space where the volume element also contains the pixel's color point.

In a typical embodiment of the invention, the method begins with an image which has a plurality of pixels each having color information that can be considered as a point in color space. If needed, the pixels' color information is converted from one color space to the preferred color space. The invention provides a means for dividing all or part of the color space into a plurality of color volume elements. Each color element has a representative color point. In effect, the color information of each pixel is replaced by the coordinates of the representative color point of the volume element the pixel falls in, thus, in effect quantizing the color space. Using the preferred color space, a relatively small number of all possible volume elements is necessary to define the color information of all images encountered in practice. In the invention, each pixel in the image is assigned its representative color point and each representative color point which represents one or more pixels in the image is marked. An index value (reference number) is assigned to each of the representative color values which represent one or more pixels in the image, and the pixels in the image are marked by the index number of the representative color value that represents that pixel. The image may then be modified according to the invention by modifying the representative color values in the set of representative color values that have been assigned indices, rather than by modifying the color values of the pixels in the image. The image, modified according to the method of the invention, may be displayed by using the index value (the reference number) for each pixel to retrieve the modified representative color value for that pixel. In this invention, the word display is general and for example includes both displaying on a display screen and printing on a hard copy device.

In the preferred embodiment, the preferred color space is CIE-LAB, and in this space, the volume elements are cubes and the representative color value for each pixel is the centroid of the cube containing that pixel. The representative color value for each pixel is denoted by the coordinates of one corner of the volume element cube, such coordinates determined by dropping (truncating) a predetermined number of least significant bits for each color parameter in the color point of the pixel. An image independent index table (typically a look-up table) is constructed with an entry for each possible representative color value. Each such entry has either a corresponding index value indicating that there's (so far) at least one pixel in the image with that representative color value, or a flag showing there is no index value for the entry. The truncated value of each pixel in the image is used as an address to the image independent index table to determine whether or not there's an index already associated with that pixel's representative color value. If not, a new index number is assigned in the image independent index table. That image pixel is given the corresponding index. An image dependent index dictionary is created for each index value. Each entry in the image dependent index dictionary includes an index value and the representative color value associated with this index value. The invention may use several image dependent index dictionaries to modify the image as described below. A display of the results of modifications to the image is formed by displaying modified representative color values rather than by displaying the image in greater color resolution in the form of modified values which were derived from modifications to the original image color values. If the computer system is idling or has computation cycles to spare (often as indicated by the operating system), then the invention may modify the original image color values and then display these modified values to achieve a greater color resolution image.

The apparatus of the invention typically includes a processor means, such as a CPU, for determining a representative color value for each pixel; the processor means also typically creates the image independent index table and the image dependent index dictionary. A memory means stores the representative color value for each pixel and typically also stores the image independent index table and the image dependent index dictionary as well as the indexed image (which in a bit mapped form shows the index value for each pixel).

Other objects, features, and advantages of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements, and in which:

Figure ("FIG.") 1a depicts a typical image comprised of rows and columns of pixels which together make up the image as displayed.

FIG. 3 further shows an example color volume element cube of the preferred embodiment of the present invention.

DETAILED DESCRIPTION OF THE INVENTION

Figure 1A:
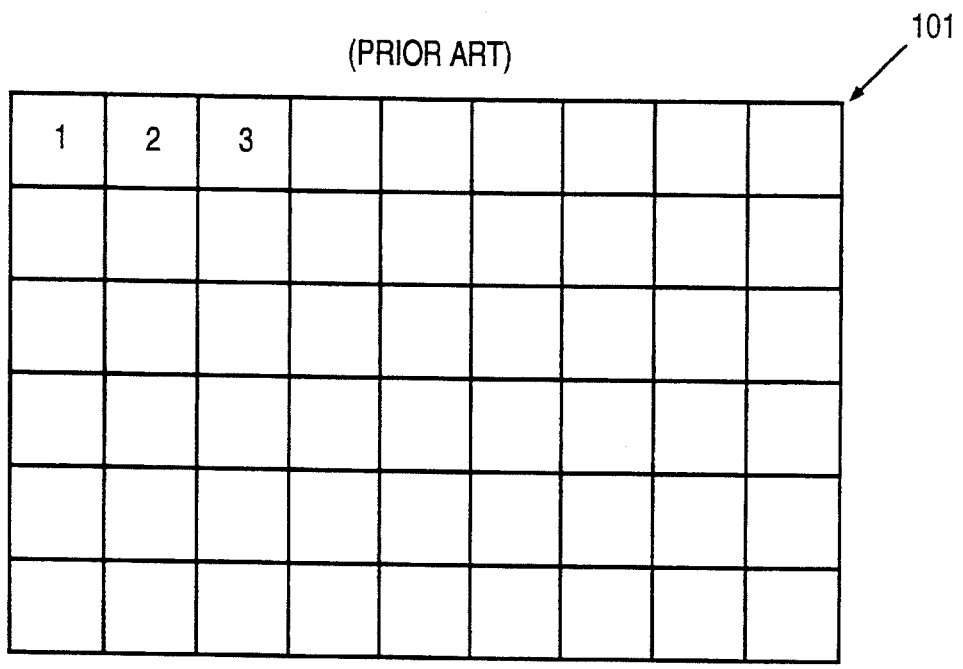
FIG. 1b further shows the 8-bits-per-pixel per color component as is commonly used by the RGB color representation and scheme for displaying on a display screen.
Figure 1B:
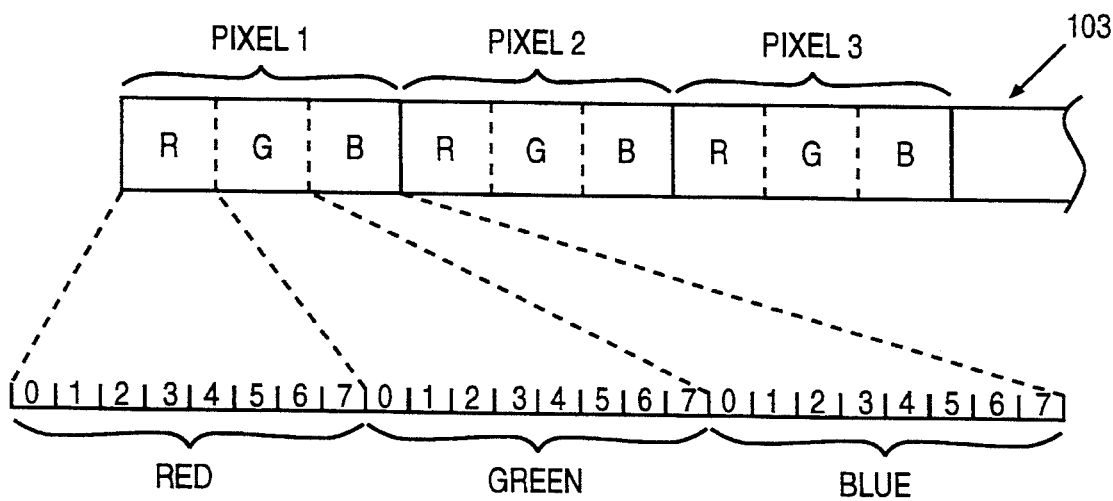
Figure 2:
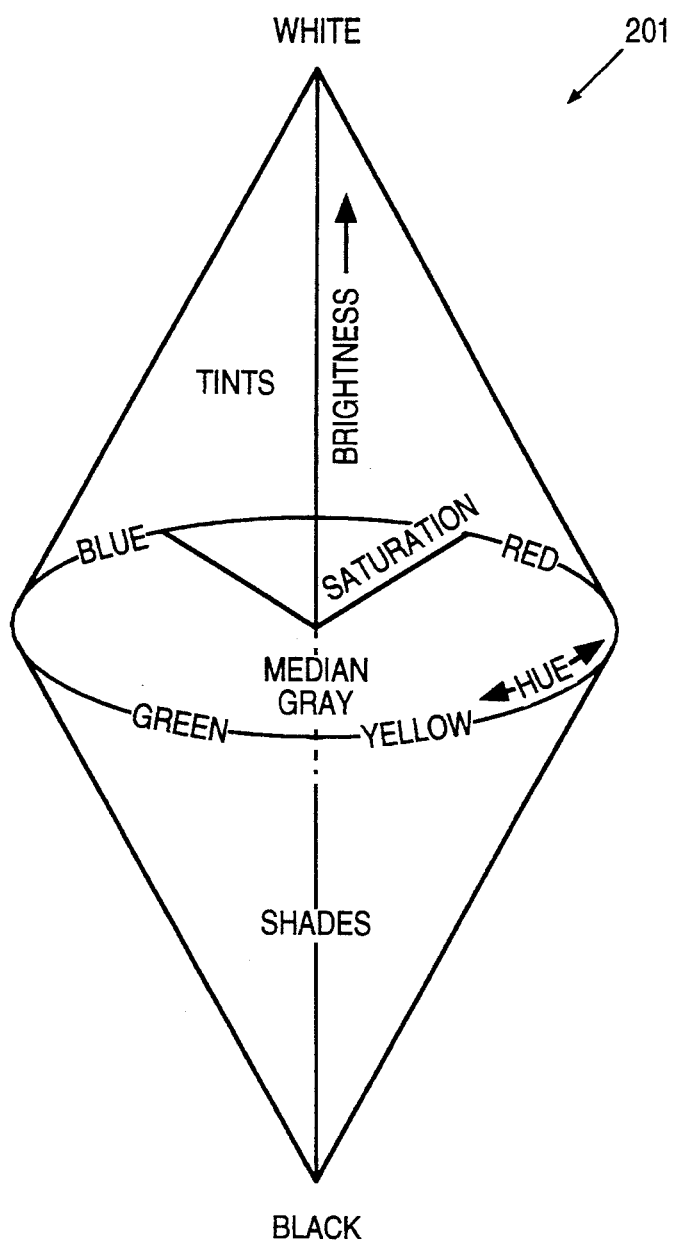
FIG. 2 depicts a typical three-dimensional color space.

In the present invention, rather than keeping track of each exact color for each pixel, approximations are used which vary only slightly from the actual color and, as such, are close enough so that the variance is not generally detectable by the human eye. Furthermore, as is explained more fully below, this approximation is variable in the present invention to allow for greater accuracy of the approximation to the original or true color, as desired. Furthermore, as is explained further below, using these approximations makes processing operations, such as color correction to be performed on the colors of an image, more computationally efficient.

The method of approximating the color information will now be explained. In the preferred embodiment of the present invention, the image color information typically begins in an RGB format, as is common in the art. Of course, if the input image is not originally in an RGB format, the input format can be converted to RGB (or, more directly, to CIE-LAB, as will be explained more fully below, or directly to any other color space in which it is desired to work), as is well known in the art. Although there are a large number of different combinations of RGB values possible, it has been found that for most images of natural scenes, many of these RGB combinations represent colors that are perceptually indistinguishable to the human eye and hence color approximations can be used.

Although image data is commonly presented in RGB, uniform color spaces such as CIE-LAB are preferable for describing color variations. "Uniform" is used here loosely as is common in the art to describe color spaces where steps of equal size (from one color point to another in color space) are perceived approximately as equal differences in color. In such a uniform three-dimensional color space, such as the CIE-LAB space, where color variation is approximately consistent for any given distance traversed, distance is measured in what is commonly known as Delta-E units (which is defined as the distance between two distinct color points). It is generally believed that the human eye cannot discern between two color points which are within approximately 1 Delta-E from each other. Furthermore, with the present invention it has been found that colors which are no more than 3 to 4 Delta-E apart are generally considered the same by the human eye as long as the colors aren't used in an area of an image having a large amount of color gradients (where the human eye might discern a slight "banding" of the colors as they shift, from one group of color points to another group of color points).

In the present invention colors are approximated by combining similar color points. Similar color points are combined by dividing a color space into multiple color volume elements, each color volume element thus comprising a subset, or portion, of the total color space. In a uniform color space such as the CIE-LAB space, as is used in the preferred embodiment of the present invention, these volume elements are cubes. All of the points in each volume element are then combined into one representative color point and thus only the representative color point for each volume element need be kept track of. The number of color points which must be kept track of is thus reduced by making one of the color points in each color volume element a representative color point for all of the color points contained within that volume element. In the art, such techniques are known as quantization techniques.

There is much redundancy in colors represented in RGB. That is, when one translates colors from the RGB space to the CIE-LAB space, colors with different R, G and B values are mapped to the same L*, a* and b*. In the preferred embodiment of the present invention, when the standard for RGB is based on the red, green and blue emitted by standard phosphors specified by the Society of Motion Picture and Television Engineers (SMPTE) with a reference white of 6500 degrees Kelvin ($D_{65}$) and with a gamma of 2.2, and when 8 bits is used for each of R, G and B, the $2^{24}$ possible colors translate to only 36,309 representative color points when 8 bits are used to represent each of the three coordinates L*, a*, and b*. Thus, $2^{24}$ possible colors can be represented by only 36,309 representative color points in the CIE-LAB color space. Using other RGB standards, such as SMPTE with a reference white of 5000 degrees Kelvin ($D_{50}$) or such as that based on phosphors specified by the National Television Systems Committee (NTSC) with either reference white $D_{50}$ or $D_{65}$, it was found that the number of representative color points remained in the order of between 36,000 and 37,000.

Then, in the present invention, the CIE-LAB space is further divided into volume elements. In the preferred embodiment of the invention, the volume elements are cubes having 64 color points per cube, with one representative color used to represent each cube thus reducing the total number of color points (color values) used. Each unique color point represents a color value in the color space. This reduction in color information provides images of sufficient detail for many viewing situations, for example, for viewing on a display screen.

To reference the representative color points (representative color values) used by a given image, an indexing scheme is used whereby the color information for each pixel of the in, age is replaced by an index number. Rather than all possible representative color points being assigned an index, only representative color points actually in the image (or which represent color points actually in the image) are assigned indices. That is, in the preferred embodiment, the $2^{24}$ possible RGB values are not only reduced to one of 36,309 possible numbers, but are further reduced to only the number of representative color points that are used in the image. An image where each pixel's color information is represented by only a reference number, or index, is known as "indexed," and in the present invention due to using only the number of representative color points that are used in the image, the indexing is said to be "image dependent."

Figure 3:
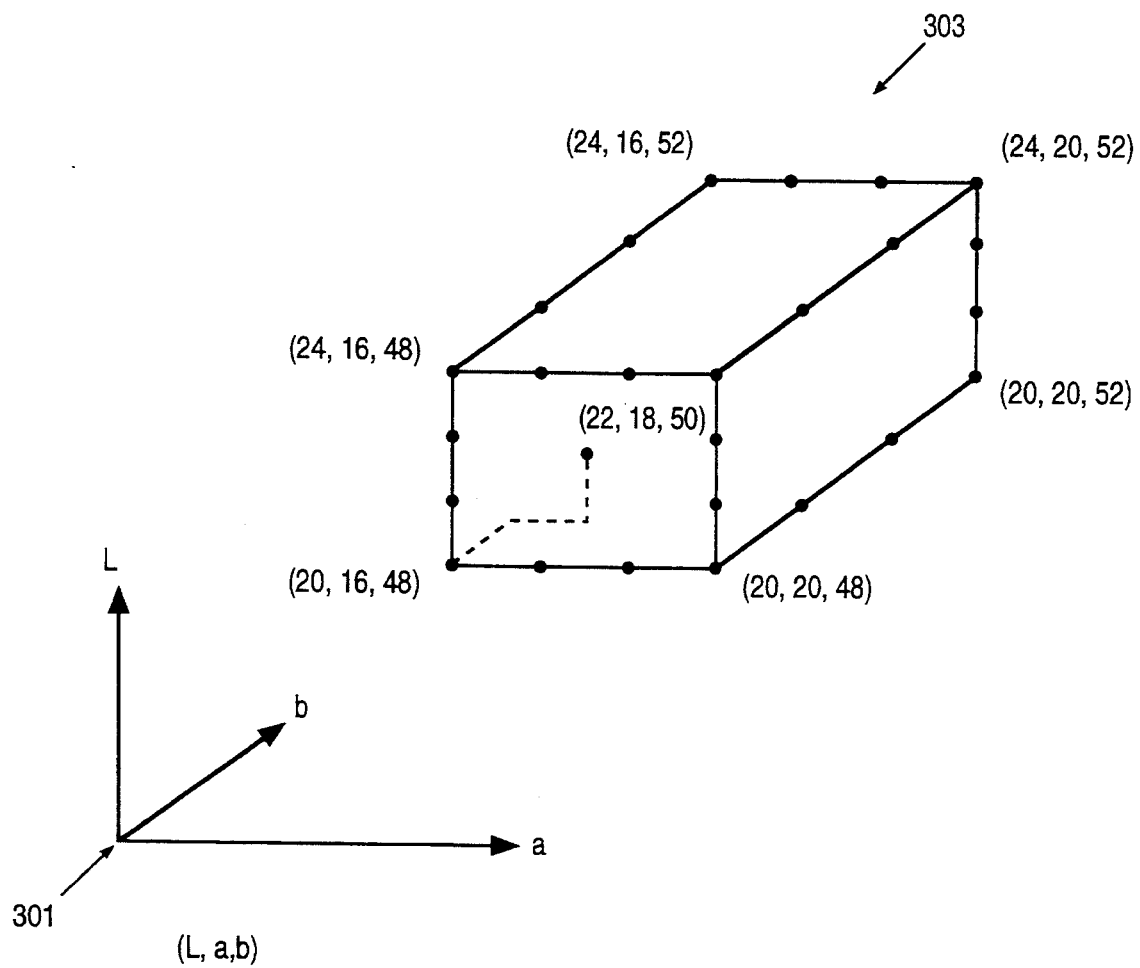
FIG. 3 depicts the three coordinates of the CIE-LAB color space, which is a uniform color space.

Referring now to FIG. 3, a more detailed description of the quantization method of the preferred embodiment of the present invention will be reviewed in which 64 points in a cube in the CIE-LAB uniform color space are replaced by one representative color value. Alternate embodiments of the present invention might maintain data in the original color space, such as the RGB space, or convert to some alternative space such as but not limited to CIE-LUV, and then the reduction of data by changing a large number of points in the particular color space by one representative point in the particular color space would proceed in a slightly modified manner which would take into account the properties of the particular color space used. An alternate embodiment also might use the CIE-LAB space as the preferred embodiment of the present d, invention, but might replace a number of points other than 64 with one representative color point. An alternate embodiment also might use the CIE-LAB space as the preferred embodiment of the present invention, but might replace the cube with another volume element such as a cuboid (a rectangular prism or rectangular box) which takes into account that the human eye is more discriminating in detecting differences in luminance than in chrominance of color.

Referring now to the preferred embodiment of the present invention, in FIG. 3, the three axes 301 of the CIE-LAB uniform color space used in the preferred embodiment can be seen. In the CIE-LAB color space, the a* and b* coordinates represent variances in chrominance of color while the L* coordinate represents degree of luminance (a measure of brilliance or lightness). Eight bits are used for each variable in the preferred embodiment.

Figure 4:
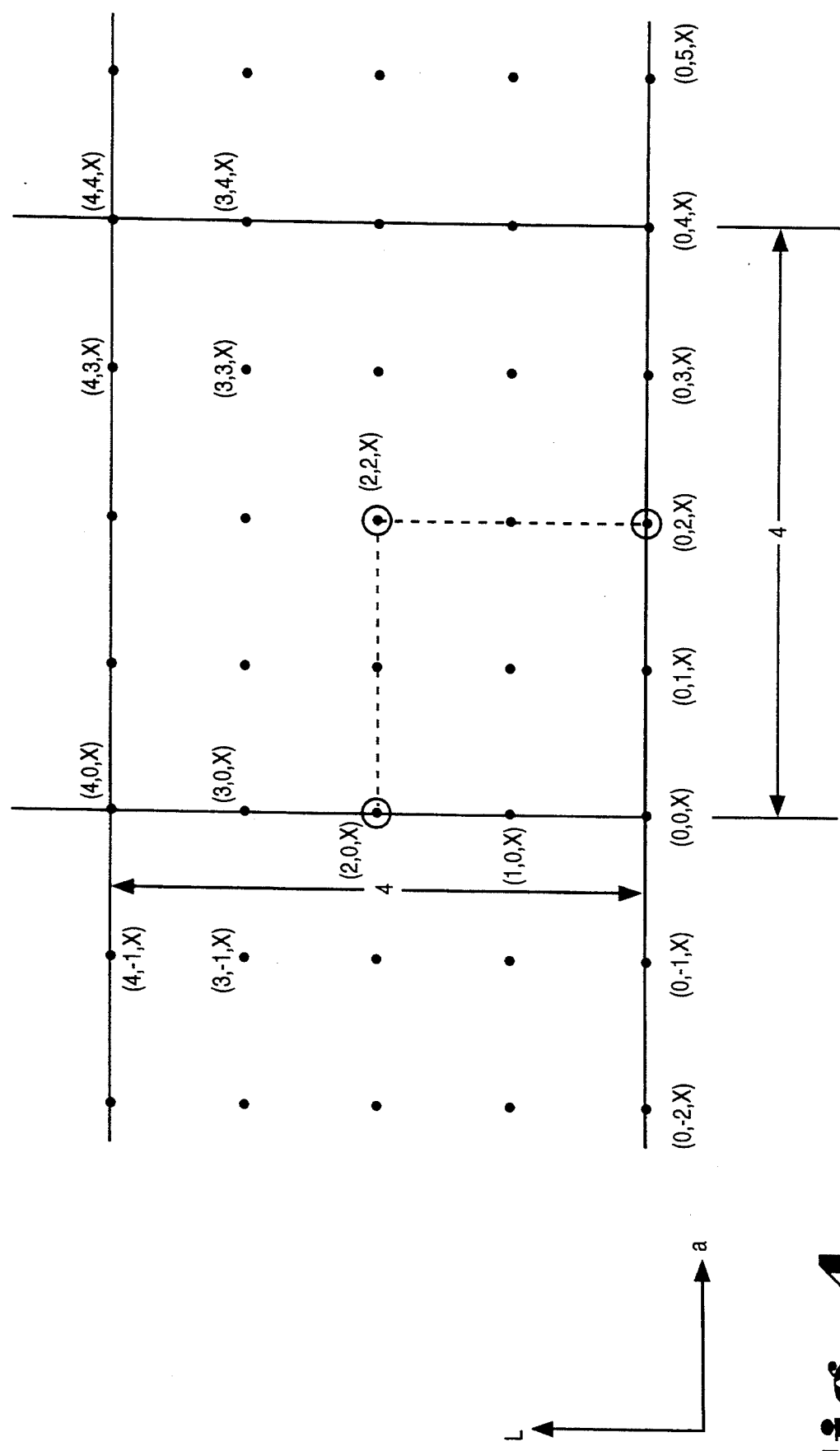
FIG. 4 depicts using the centroid of a color volume element cube as the representative color point for all color points contained within each cube.

In the preferred embodiment, when working in a uniform color space such as CIE-LAB, cubes are used as the volume elements. All points that fall within a volume element are replaced by one representative color point within the volume element. An example color cube volume element 303 is shown in FIG. 3 where each color cube of the preferred embodiment of the present invention has four color points per edge and thus contains a total of 64 color points (4×4×4). One color point of each cube is used as the representative color point to thus approximate the color of each color point in that cube. Referring now to FIG. 4 (where only two of the three dimensions of the CIE-LAB color space are shown), in the preferred embodiment of the invention, the representative color point for a given 4×4×4 color cube is chosen as the centroid of all the color values in that cube which is the point which is, as is explained further below, at an "L*" value of +2, an "a*" value of +2 and a "b*" value of +2 from the corner color point with the lowest values of L*, a*, and b* ("lowest corner"). That is, the approximation for all of the 64 color points in a particular cube is chosen as the centroid of that cube. In the two dimensional example of FIG. 4, this is shown as point (2,2,x) in the L* and a dimensions (an "x" is used for the third dimension to indicate that the third "b*" dimension is not used in FIG. 4). For example, with a color cube having a corner at (0,0,0) the representative color point would be (2,2,2). Likewise, for a color cube having a lowest corner at (4,20,32) the representative color point would be (6,22,34). And similarly, for a color cube having a lowest corner at (−4,−8,−12) the representative color point would be (−2,−6,−10). What is thus done in the preferred embodiment of the present invention is to approximate each pixel's color point translated to a given cube with the representative color point which is at L*+2, a*+2, and b*+2 from the lowest value corner point of that cube. It will be appreciated that this approximation results in the representation of many pixels in a typical image by an approximation, and consequently, many of the representative color values will not be found in the original image data set.

It will now be explained why the centroid of all the points in a given 4×4×4 color cube is the point which is at an L* value of +2, an a* value of +2 and a b* value of +2 from the corner color point with the lowest values of L*, a*, and b* ("lowest corner"). Because a color space is comprised of a continuum of colors rather than a set of discrete colors (as might be inferred from the term "color points") there are color variations which occur between each discrete color point represented by 8-bit integers for L*, a*, and b*. Thus, there is already an inherent quantization of the color space. Replacing 64 color points in a particular cube by the color coordinates of the centroid of that cube is further quantization of the color space. Is assumed that the initial quantization of using 8-bit integers for the color space coordinates involves truncation. That is, when counting from zero and moving along either the a*-axis, b*-axis, or L*-axis (or, as shown in FIG. 4, for the two-dimensional L*-a* case), any color between a color point of 0 and a color point of 1 gets assigned a color point value of 0. Similarly, any color between a color point of 1 and a color point of 2 gets assigned a color point value of 1, any color between a color point of 2 and a color point of 3 gets assigned a color point value of 2, and any color between a color point of 3 and a color point of 4 gets assigned a color point value of 3. In other words, color points 0 through 3 cover the color range of 0 through 3.999999 ... The centroid of all the points in a given 4×4×4 color cube is then the point which is at an L* value of +2, an a* value of +2 and a b* value of +2 from the corner color point with the lowest values of L*, a*, and b* ("lowest corner").

Of course, this invention is not limited to truncation as the rounding technique for integer values of the color space.

In a further embodiment of the present invention, each representative color point for a given volume element need not be the centroid of that volume element. For example, it may be desired that the color points in those volume elements which include neutral colors (colors which have no chrominance, from white to gray to black) be represented by representative color points which are themselves neutral. Thus, in an alternate embodiment of the invention, all color points in a 4×4×4 volume element color cube which includes one or more points on the a*=b*=0 axis (the neutral axis) would be represented by a representative color point which has color coordinates with an L* value of +2, the same a* value and the same b* value from the lowest values of L*, a*, and b* ("lowest corner") in the cube. Color points in any other volume element cube which does not include any neutral points are represented by the centroid of all the points in a given 4×4×4 color cube as above.

Furthermore, in accordance with the preferred embodiment of the present invention, because each pixel's color point in CIE-LAB is comprised of eight bits for each of the three coordinate values L*, a*, and b*, and because cubes with four color points per edge are used, the six high order bits (six most significant bits) of each of the L*, a*, and b* values for any given point can be used to determine which color cube a particular color point belongs to. This can be done by replacing the two low order bits (two least significant bits) of each of the L*, a*, and b* values for any given point with zeroes which, as a result, calculates the lowest value corner color point of the color cube which that particular pixel's color point belongs to.

Once the particular color cube (and its lowest value corner color point) is determined then the pixel's color point can be assigned the representative color point of that cube. The pixel's color point in CIE-LAB coordinates can be assigned the representative color point by placing a 0 in the least significant bit and a 1 in the next least significant bit of each of the three L*, a*, and b* coordinates of the lowest value corner color point of the cube which that pixel's color point belongs to. This is because placing "10" in the two least significant bits of each of the three L*, a*, and b* coordinates of the lowest value corner color point adds two, in binary, to each of the coordinate values of that lowest value corner point thus moving to the representative color point for that cube.

The quantization step (assigning each pixel to a representative color point for the 4×4×4 color cube which that pixel's color maps into) can reduce the number of colors which need to be kept track of for a given image by a factor of up to 64 in the preferred embodiment of the present invention. In the preferred embodiment where eight bits are used to represent each of the red (R), green (G) and blue (B) values, and the RGB format used is in accordance with RGB specified by the SMPTE standard with reference white D$_{65}$ and with a gamma of 2.2, then there are only 36,309 color cubes when the RGB format is converted to the CIE-LAB format with 8-bits for each of the L*, a* and b* values and the preferred embodiment quantization method is used.

Figure 5:
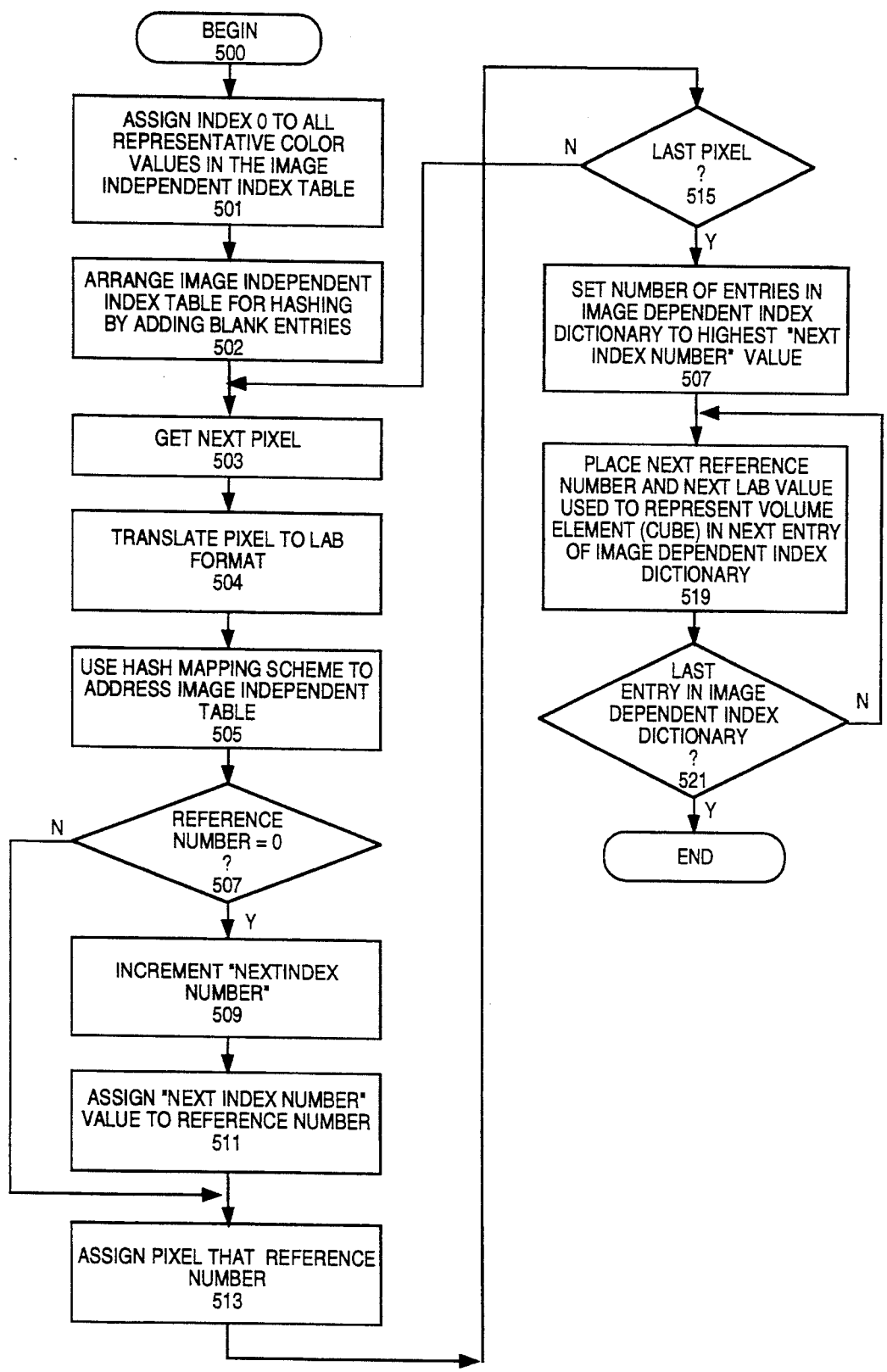
FIG. 5 depicts a flowchart of the indexing method of the preferred embodiment of the present invention.

Referring now to FIG. 5, the indexing method of the preferred embodiment of the present invention will be more fully explained. All the representative colors for all volume elements are first listed in a table. As explained above, there are only 36,309 such representative color points when the RGB is as specified by the SMPTE standard with reference white D$_{65}$ and with a gamma of 2.2 and the RBG format is converted to the CIE-LAB format with 8-bits for each of the L*, a* and b* values. Since each entry of the table represents a cube in CIE-LAB space, either the lowest corner of the cube or the actual representative L*, a*, and b* value for that cube can be used as the entry when the table is in the CIE-LAB format. In the preferred embodiment of the present invention, the lowest value corner point of the cube is used as the entry, since the cube corner is represented by substituting zeroes for the two least significant bits of each possible eight bit value of L*, a*, and b*, only the six most significant bits of each of the coordinates are entered at each location in the table. This reduces the amount of memory used for the table. For each of these entries in the table, a unique integer number called an index is assigned as is described more fully below. This table is called the "image independent index table" in the preferred embodiment.

Initially, 501 a uniquely identifiable initial index value is assigned to each entry of the image independent index table to indicate that that representative color value has not yet been encountered in the image. In the preferred embodiment of the present invention, an index value of zero is initially assigned to each entry (effectively this zero value serves as a flag). To make searching this table computationally more efficient, many more entries are added to this table and left blank, in step 502, in order to use hashing as a means of addressing or searching the table. In the preferred embodiment of the present invention 13,692 entries are added so that the image independent index table contains 50,001 entries (13,692+36,309). Hashing is a searching technique well known in the art (see, e.g., Donald E Knuth, "The Art of Computer Programming, Volume 3: Sorting and Searching," Addison-Wesley Publishing Company, Reading, Mass., 1973). The particular hashing scheme used in the preferred embodiment of the present invention is explained more fully below. Alternate embodiments of the present invention might use techniques other than hashing to search the table, and such techniques might not require entries to be added to the table. Alternate embodiments might use hashing for searching the table as does the preferred embodiment but might use different hashing schemes from that used in the preferred embodiment.

To index an image comprised of pixels having color information in an RGB format, in the preferred embodiment each pixel's three color values are obtained (step 503) and then converted (step 504) to a point in the CIE-LAB three-dimensional color space format. In the preferred embodiment of the present invention, each of the three CIE-LAB coordinates, after translation from the RGB color format, is represented by a single byte (eight bits). These three bytes, representing the color point of a translated pixel (from RGB to a point in a three dimensional color space such as CIE-LAB), are used, in step 505, to search, via the hashing scheme, the image independent index table for the cube within which lies the color point of the translated pixel. Because the table contains the six most significant bits of each of the L*, a*, and b* values for the lowest value corners of all of the color cubes, searching is done by first converting the eight bit per CIE-LAB coordinate pixel data to six-bits per CIE-LAB coordinate data (by dropping the two least significant bits). The hashing scheme used in the preferred embodiment of the present invention is described more fully below. When a search using the pixel's abbreviated CIE-LAB data finds the appropriate location in the image independent index table, this is referred to as that pixel "addressing the table."

When a translated pixel addresses a location in the image independent index table (which is a look up table), a reference number field (containing the index value) in that location is first checked, in step 507, to see if it is set to zero. If the reference number field is set to zero (or some other predefined initial value indicating that this particular color cube has not been addressed before by another pixel in this image), a new reference number (index value) is assigned to that reference field and that pixel is then indexed by that reference number. This new reference number is the index value for that pixel. In the preferred embodiment, to determine a new reference number a "next index number" count is incremented in step 509. The reference number field is assigned the new value of the "next index number" count in step 511, and that pixel is assigned that reference number (index value) in step 513. If the reference number field is not set to zero (indicating that this particular color cube has been addressed before by another pixel in this image) then the pixel is merely assigned the reference number previously assigned to that reference number field.

Then, after all of the pixels in the image have been translated to CIE-LAB and indexed by searching (addressing) the image independent index table (as determined by a "yes" in step 515), a new look up table is created which contains the color information of the representative points for each index value used. This table is called the "image dependent index dictionary" in the preferred embodiment of the present invention, and is created from the data in the image independent index table. When a "next index number" count is used as in the preferred embodiment, the image dependent index dictionary is given as many entries as the highest "next index number" count value reached after all of the pixels of the image were indexed (step 517). Each entry of the image dependent index dictionary (table) is made up of one of the reference numbers (index values) set in the image independent index table and that reference number's associated color cube representative color point with L*,a*,b* values. In the preferred embodiment of the present invention, to form this dictionary, the image independent index table is scanned and each entry for which the reference number (index value) is non zero is collected and the non-zero index value from an entry in the image independent index table is placed in an entry in the image dependent index dictionary along with the representative color value for that entry, as shown in step 519. The representative color point of an entry of the image dependent index dictionary is calculated from the L*, a* and b* values in the corresponding entry of the image independent index table by first adding two zeroes as the least significant bits to make eight bit numbers. Note that this is equivalent to multiplying in binary the six bit numbers by the binary for the number 4. Then 2 (a binary "10") is added to each of the (now 8-bit) L*, a*, and b* values. This operation is equivalent also to concatenating; the two-bit pattern "10" to each six-bit L*, a* and b* value of the image independent index table to form the 8-bit L*, a* and b* values of the representative point which corresponds to the entry in the in, age independent index dictionary which has the same index value.

Having formed the image dependent index dictionary and with each pixel having a reference number (index value), the image is now "indexed."

In an alternate embodiment of the present invention, the step 519 of placing the index value and the representative L*,a* and b* values in the image dependent index dictionary could occur immediately after step 511 of assigning an index value to a newly encountered point in the image independent index table. This requires initially assigning storage space for the image dependent index dictionary before the actual length of the image dependent index dictionary is known. Therefore there could be cases when the storage space assigned was too small for the length of the dictionary required by the particular image. To make provision for such cases, a linked list would need to be used for the image dependent index dictionary rather than the simple linear list used in the preferred embodiment of the present invention. This might add computational overhead in forming and using the image dependent index dictionary.

Having formed the image dependent index dictionary, and with each pixel having a reference or index number, the image is now "indexed." Once the image dependent index dictionary is formed, the image independent index table is no longer used.

The hashing scheme of addressing the image independent index table as used in the preferred embodiment of the present invention will now be more fully explained. The hashing scheme uses an image independent index table with 50,001 entries where only 36,309 entries actually contain color cube points. Each color point in the table is a unique L*, a*, and b* coordinate value with six bits representing each cube's lowest corner value of L*, a*, and b*. Although there are 218 combinations of three 6-bit numbers possible, only 36,309 such combinations are present in the image independent index table, as was explained above.

The hashing algorithm used to address the entries in the image independent index table operates as follows: When a pixel's RGB color information is translated into three bytes of the CIE-LAB color space, the 6 high order bits (six most significant bits) of each byte are used. It must be determined whether these three 6-bit members form one of the entries in the image independent index table. The hashing scheme does this efficiently as follows: Three tables (LTable, aTable, and bTable) are formed by methods well known in the art. These tables are used as look-up-tables. If $L_8 a_8 b_8$ is used to denote an element of the set of all L*, a*, and b* values produced from all possible RGB values (when using the SMPTE standard with $D_{65}$ reference white and with a gamma value of 2.2), and $L_6 a_6 b_6$ is used to denote the three 6-bit numbers obtained by truncating the two low-ordered bits of each of $L_8 a_8 b_8$, then the address in the image independent index table to examine is calculated by adding the results of looking up $L_6$ in LTable, $a_6$ in aTable, and $b_6$ in bTable. This is known in the art as the hashing function and is denoted here by $h(L_6, a_6, b_6)$ so that $h(L_6, a_6, b_6) = $ LTable $(L_6) + $ aTable$(a_6) + $ bTable $(b_6)$.

If the entry in location $h(L_6, a_6, b_6)$ of the image independent index table is $L_6, a_6, b_6$, then this means that the proper entry was found (called a "hit" in the art). If there is no hit, another attempt is needed and this is done by adding a "jump value" to the current location searched to form a new location to try. This addition is performed modulo the length of the image independent index table to ensure that the result is a valid table location. In the scheme of the preferred embodiment of the present invention, a jump value of 211 is used for the table of length 50,001. This jump value was chosen for the preferred embodiment because it was found that use of this jump value with the other chosen parameters guarantees a maximum of three tries before a hit is obtained. In the preferred embodiment of the present invention, using images of natural scenes, an average of 1.055689 tries is required to obtain a hit.

Note that alternate embodiments of the present invention might use other table lengths and hashing schemes, or might use other methods for searching ("addressing") the image independent index table.

Figure 6:
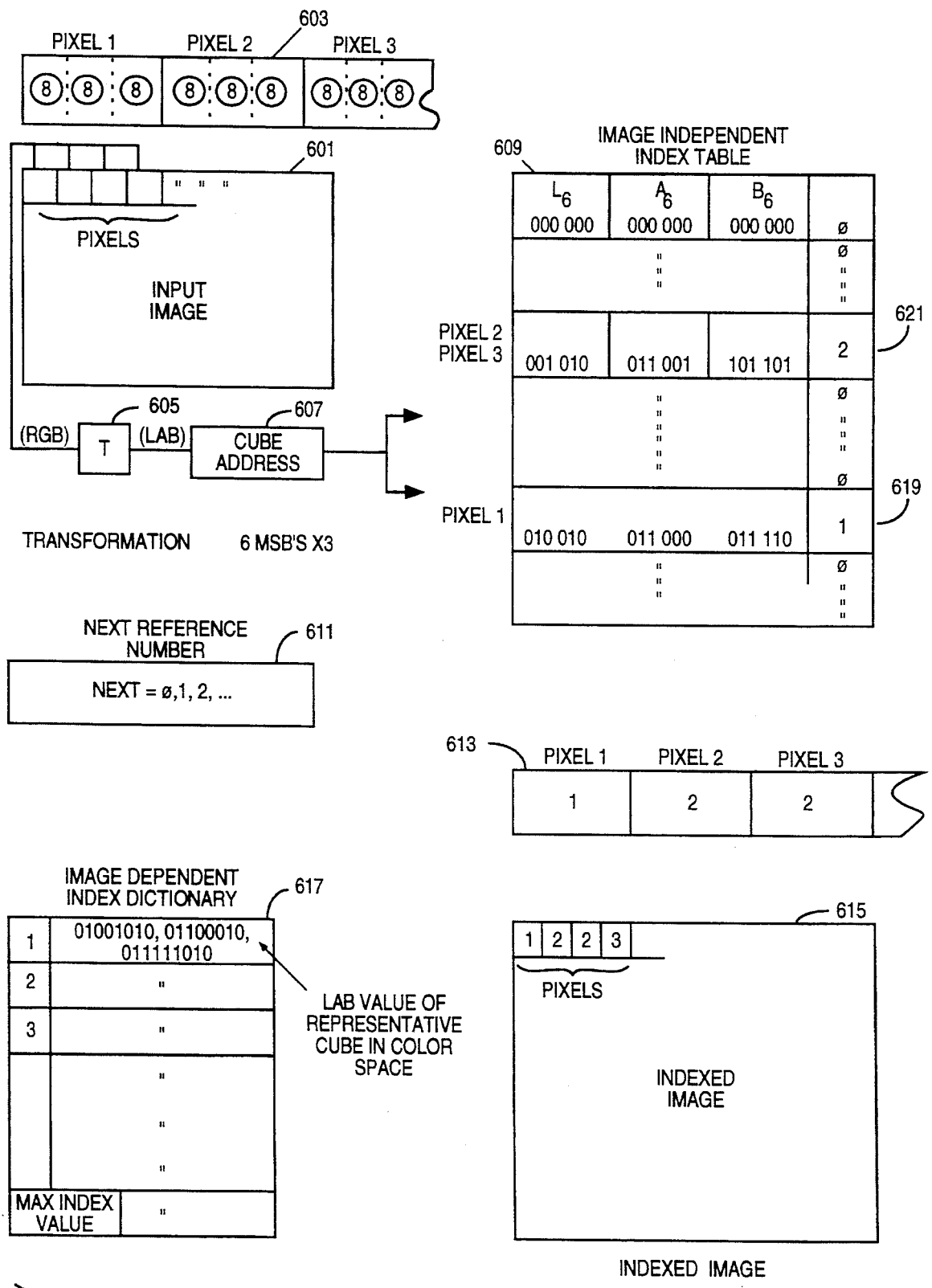
FIG. 6 depicts an example of the indexing method of the preferred embodiment of the present invention.

Referring now to FIG. 6, an overview of the preferred embodiment of the present invention can be seen. Starting with an original or input RGB color image 601 stored as three bytes per pixel 603, each pixel goes through a transformation 605 whereby each RGB pixel is translated to three bytes of CIE-LAB color information. Then, the six most significant bits of each of the three bytes of CIE-LAB color information are used as an address 607 (using the hash mapping scheme discussed above) to the image independent index table 609. If the reference number at that location is zero, the "next reference number" count 611 is incremented (adding 1 to the current count) and that incremented number is assigned to the current pixel as the index value (reference number) for that pixel. If the reference number at that location is not zero, the "next reference number" count 611 is not incremented and the reference number is left at the previously assigned number. Then that pixel is assigned the reference number of that location in the image independent index table. Thus, for example, pixels 2 and 3 of FIG. 6 have the same index value 621 ("2") which means they are represented by the same index value and have the same representative color value from the image independent index table. This occurs in the method of the invention when, after pixel 2 has been assigned the index value of "2", then pixel 3 addresses the table 609 and the index value of "2" is found (which is not equal to the initial value) and therefore pixel 3 is assigned the same index value of "2".

After all of the pixels in the input image 601 have been transformed 605 and have addressed 607 the image independent index table 609, an image dependent index dictionary 617 is created. Each referenced entry (having a non-zero index value) in the image independent index table 609 (which contains both the reference (index) number and the L*, a*, and b* values for the lowest value corner point of the cube containing the representative color point) is used to make a separate entry in the image dependent index dictionary 617. The L*, a*, and b* values of the representative point of each cube is used in the image dependent index dictionary, rather than the lowest value corner point as in the image independent index table. Thus, each pixel can now be stored as a reference number 613 to an entry in the image dependent index dictionary containing the representative color point values and can be displayed on a display screen as an indexed image 615. Furthermore, the image may be modified by operating on only the representative color values in the image dependent image dictionary rather than all the individual pixels and rather than all the different (and typically many more) colors in the image.

The following example is used to illustrate the process. Referring to FIG. 6, suppose that the first three pixels of input image 601 have RGB values 603 that after transformation t to 8-bit L*, a* and b* values, have the following data, shown here in the integer decimal values of the 8-bit binary data

|  | $L_8$ | $a_8$ | $b_8$ |
|---|---|---|---|
| Pixel 1 | 73 | 96 | 122 |
| Pixel 2 | 40 | 102 | 183 |
| Pixel 3 | 40 | 103 | 181 |

Consider Pixel 1. When the six most significant bits are used in order to search the image independent index table 609, then Pixel 1 has values $L_6=18$, $a_6=24$, and $b_6=30$, which in binary form are $L_6=010010$, $a_6=011000$, and $b_6=011110$. After at most three tries, the hashing scheme finds this entry in the image independent index table 609. After checking that the reference value location 619 is at the initial value 0, the reference value location 619 is changed to index value 1 (since the counter 611 starts at zero, incrementing by 1 yields the index value of "1"). In the indexed image 615 Pixel 1 is indexed with reference number 1 as shown in 613 of FIG. 6.

Consider now Pixel 2. When the six most significant bits are used in order to search the image independent index table 609, then Pixel 2 has values $L_6=10$, $a_6=25$, and $b_6=45$, which in binary form are $L_6=001010$, $a_6=011001$, and $b_6=101101$. After at most three tries, the hashing scheme finds this entry in the image independent index table 609. After checking that the reference value location 621 for the addressed entry is at the initial value Q, the reference value location 621 is changed to index value 2. In the indexed image 615 Pixel 2 is indexed with reference number 2 as shown in 613 of FIG. 6. To continue with this illustrative example, consider now Pixel 3. When the six most significant bits are used in order to search the image independent index table 609, then Pixel 3 also has values $L_6=10$, $a_6=25$, and $b_6=45$, which in binary form are $L_6=001010$, $a_6=011001$, and $b_6=101101$. These are the same values as for Pixel 2. That is, even though Pixel 2 and Pixel 3 have different CIE-LAB values, they are mapped to the same representative color cube in CIE-LAB space. Again, after at most three tries, the hashing scheme finds this entry in the image independent index table 609. This time, checking reference value location 621 shows that it is not at the initial value 0, so the reference value location 621 is not changed and remains at index value 2. In the indexed image 615, Pixel 3 is indexed with reference number 2 as shown in 613 of FIG. 6. In alternative embodiments, the a* and b* values for index table 609 may be 4 bit values (derived from the 4 most significant bits of $a_8$ and $b_8$) while the L* value for table 609 may be 6 or 8 bit values. Other variations may be used.

This process continues until all the pixels in the image have been indexed. The next step is to generate the image dependent index dictionary 617.

Figure 10:
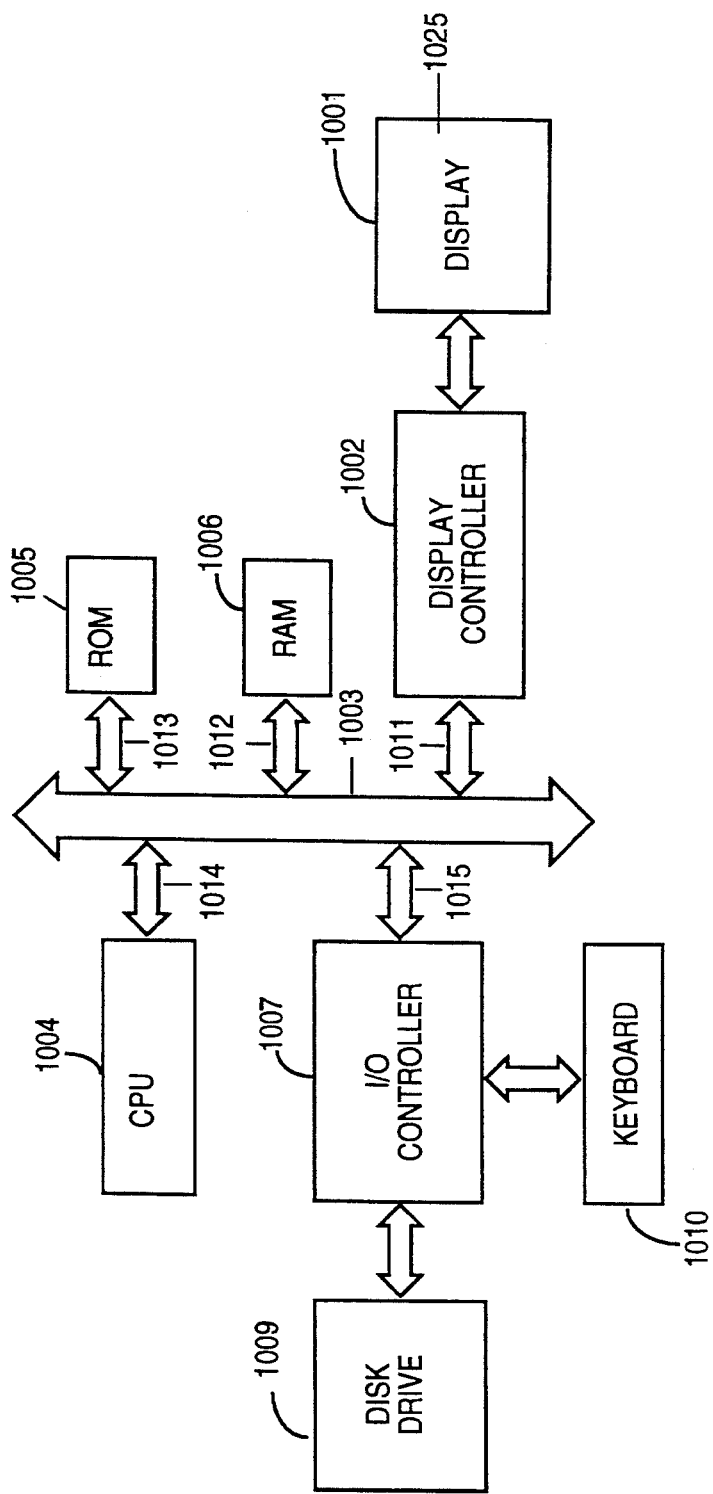
FIG. 10 shows a typical computer system which may be used with the present invention.

The process of the invention is typically performed in an image processing system comprising a conventional computer system such as that shown in FIG. 10. A typical computer system includes a processing means, such as a CPU 1004 (which may be a microprocessor), which is coupled to memory in the form of RAM 1006 and ROM 1005 by a system bus 1003 and by interconnect buses 1014, 1013, and 1012. The system also includes a display screen device 1001 for showing an image 1025 to the user; the display screen device is coupled to the processor by the system bus 1003 and a display controller 1002, and it, may be any of the conventional display screens, such as a CRT monitor or a LCD display screen. The system further includes a disk drive 1009 for mass storage which is coupled to the system through an I/O controller 1007, which also couples a keyboard 1010 (and other input devices not shown) to the system. The image independent index table 609 and the image dependent index dictionary 617 will typically be created by the processor means 1004 and stored in the memory 1006. The resulting image is, of course, displayed on display screen 1001 and processing of the image (such as modifying color cast or exposure) is performed by first operating on the representative colors in the dictionary 617 (and displaying the resulting image on the display screen) and then, if the computer system is idling, processing the actual (full resolution) colors in the original image and displaying on the display screen the results of processing in full resolution.

Processing, screen-displaying, and storing the color information of an indexed image will now be described in more detail. The image information for the indexed image 615 consists of pixels which now contain only the indices or reference numbers. To display on the display screen, store, etc., the image, that is, to obtain the color information of the image, the indices are used to address the image dependent image dictionary. This can be done very fast. An advantage of indexing the image is that whenever any processing, such as a color modification, is to be made to the image, rather than having to calculate the modifications for each individual pixel, one pixel at a time, the modification calculations need only be made to the entries of the image dependent color dictionary (which are typically far fewer than the actual number of pixels in the original input image). That is, the changes are made only to the representative color point for each color cube containing an affected color point. Because the image dependent color dictionary contains far fewer entries than there are pixels, that is, because there are generally far fewer representative color volume elements (e.g. cubes) than there are pixels (actual practice has shown approximately a 98% reduction from the number of pixels to the number of color cubes for a given image because of the reduced number of color points maintained and because of the reference number "sharing" between different pixels which translated to color points in the same color cube), there are fewer calculations which need to be made when modifying an electronic color image. This improved recalculation time thus translates into the ability to more quickly re-display the modified image on the display screen. This is an important advantage of the indexing method of the present invention for interactive processing of image information when an almost instantaneous response on the display screen to any changes made is desirable.

One benefit of using the indexing method of the present invention is illustrated in FIG. 6. Whenever a user wishes to modify the color information for the indexed image 615, all that needs to be recalculated are data points in the image dependent index dictionary. In the preferred embodiment of the present invention, the dictionary uses the CIE-LAB color space, so that whenever a user wishes to modify the color information for the indexed image 615, all that needs to be recalculated are the L*, a*, and b* values in the image dependent index dictionary 617 which correlate to the affected pixels in the indexed image 615. And because multiple pixels (e.g., pixel 2 and pixel 3 in 615 of FIG. 6 which both have an index of 2) often reference the same entry in the image dependent index dictionary 617, to recalculate the color for these multiple pixels (the L*, a* and b* values in the preferred embodiment where the CIE-LAB color space is used) only requires one recalculation and hence can be accomplished much more quickly than can recalculating each individual pixel's color information separately. Once color changes are implemented by modifying the colors in the image dependent color dictionary, the image can be displayed on the display screen, or stored, etc., by addressing the modified image dependent index dictionary (i.e. each pixel in the indexed image 615 uses its index value to locate (address) the modified representative color value in the image dependent index dictionary 617).

Note that although this processing in the preferred embodiment of the present invention is in the CIE-LAB color space, the method of the present invention is not limited to entries in the image dependent index dictionary being in the CIE-LAB color space nor is it necessary for modifications of color information to be made in the CIE-LAB color space.

Another benefit of indexing images is the resulting reduction in digital information required to store a given image. As compared to utilizing three bytes per pixel in a typical image maintained in an RGB format, the pixels in an indexed image can be stored simply as a series of reference numbers to an image dependent index dictionary. Thus, the method of the present invention reduces image storage requirements as well as provides faster color alteration capabilities. A further advantage of reduced image file size is the ability to transmit an image between computers, across networks, etc., much more quickly. Thus the method of the present invention also provides faster data transmission of an image.

Furthermore, again because of the reference number sharing of pixels in a given image and the resulting small number of indices, printing time can also be reduced. Printing of images is typically done by converting the colors (RGB, CIE-LAB, etc.) to colorant values representing the amount of inks needed to print the particular color in the image. Typically these colorants are cyan, magenta, yellow and black, in which case such colorant values are usually called CMYK values. The process of converting to colorant values is known as (color) separation, and each resulting monochrome image of each colorant value is known as a separation. By only having to calculate the colorants for each index value used (that is, each shared reference number, as opposed to calculating the colorants for each individual pixel separately), the amount of calculations necessary to produce separations in order to print an image is thus reduced.

Once the image dependent index dictionary is formed, the color information for each index can be converted to different color spaces which may be more computationally efficient to use depending upon the type of processing to be performed on the color information. Means for converting between color spaces are known in the art. Changing of colors, matching colors and applying color filters are examples of operations for which it is known in the art that there are advantages for using a color space such as the CIE-LAB and HSB. On the other hand, it is known in the art that there are advantages to performing operations in the RGB color space. Such operations include exposure change, brightness change, contrast change, shadow, midtone and highlight change and. changes to the white point and the dark point. Display of image information on the display screen is also often preferably carried out in RGB.

More than one image dependent index dictionary may be maintained for the same image in order to facilitate processing. In the preferred embodiment of the present invention, two in, age dependent index dictionaries are maintained, an input dictionary and an output dictionary. When the indexed image is to be displayed on the display screen, or the resulting indexed image after a processing operation (e.g. change of color hue) is to be displayed on the display screen, the output dictionary is maintained in the RGB color space. When the indexed image is to be processed or the resulting indexed image after a processing operation is to be further processed, then the color space of the data in the output dictionary is chosen to be the space appropriate for input to the next processing operation. In that case, the output dictionary for the first operation becomes the input dictionary of the second operation.

Figure 7:
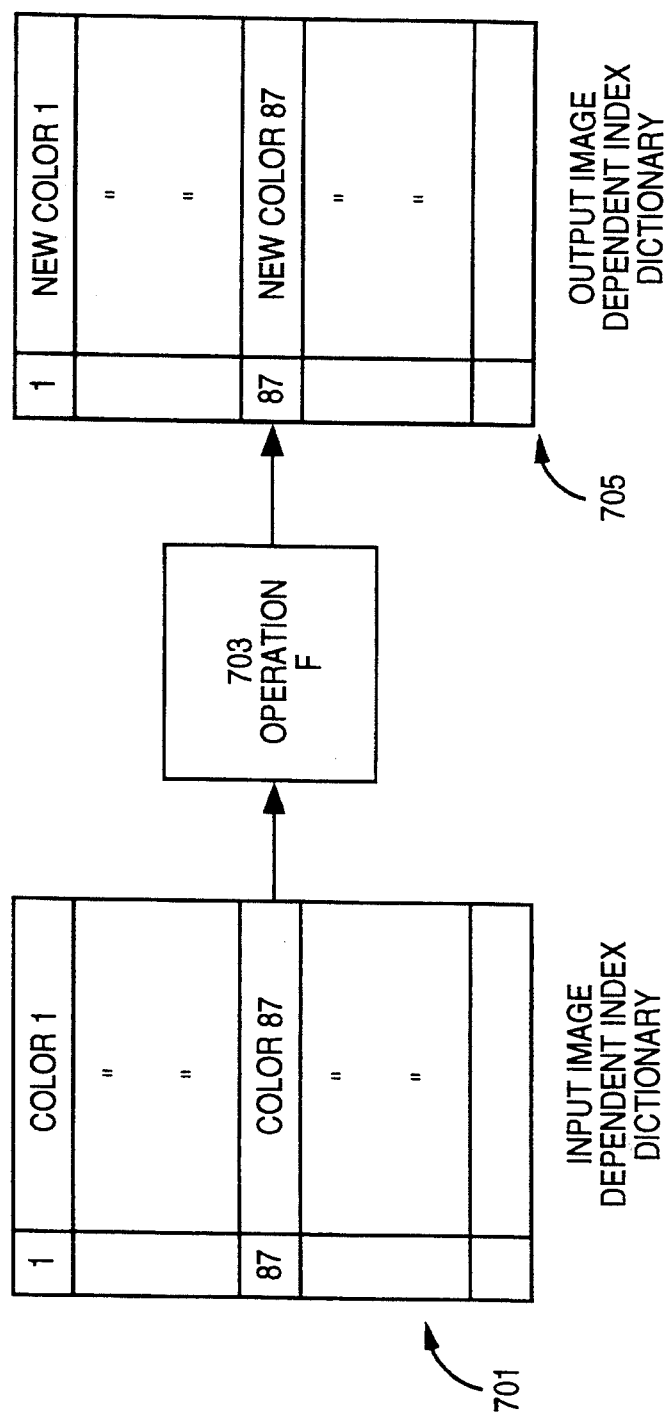
FIG. 7 depicts processing operations on the image dependent index dictionary.

The method for performing processing operations on indexed images in the preferred embodiment of the present invention is shown in FIG. 7. The processing operation 703, to be performed on the color information of the image, is denoted in the figure by the transformation f. Each color in the input image dependent color dictionary is converted to a corresponding color in the output image dependent color dictionary determined by applying transformation f to each input image dependent color dictionary color. For example, in FIG. 7, if one denotes by $color_{87}$ the color corresponding to index 87 in the input image dependent index dictionary 701, this color would be transformed by the transformation f to a corresponding new color, denoted in the example by new-color87, where new-$color_{87}$=f($color_{87}$) and this new-$color_{87}$ is the color corresponding to index 87 in the output image dependent index dictionary 705.

Figure 8:
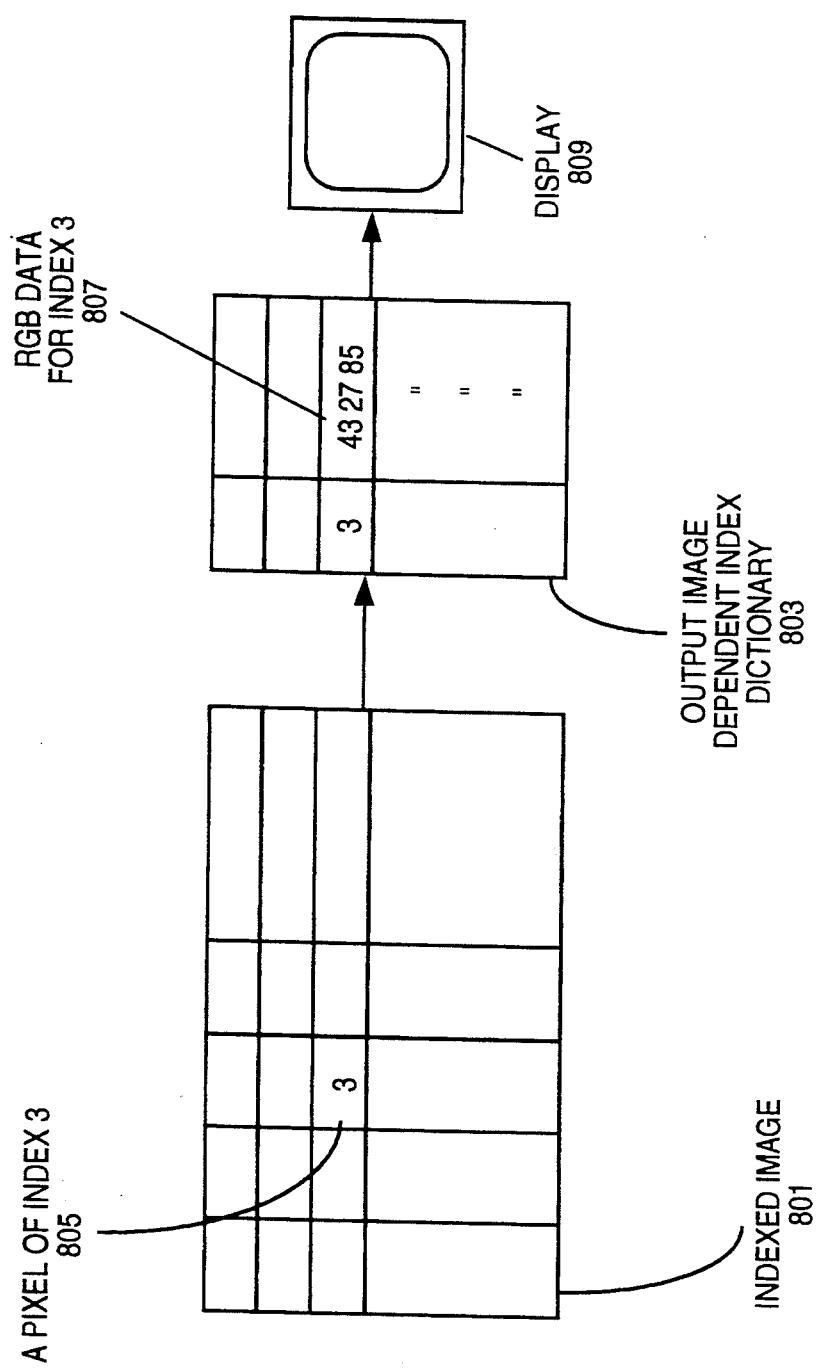
FIG. 8 depicts screen-display operations on the screen-display image dependent index dictionary.

In the preferred embodiment of the present invention, the method used when the result of an operation is to be screen-displayed is illustrated in FIG. 8. In FIG. 8, because it is to be displayed on the display screen, image dependent index dictionary 803 would have indexed color information values in RGB. The screen-display operation of FIG. 8 would involve scanning the indexed image pixel-by-pixel, row-by-row and using the output image dependent index dictionary 803 as a look-up table to determine the RGB values to be screen-displayed for each pixel. As an example, pixel 805 in the indexed image 801 is screen-displayed by looking up index 3 (pixel 805's index) in the output image dependent index dictionary 803 and passing to the display 809 the RGB values of R=43, G=27, and B=85, which are the RGB values 807 corresponding to index value 3 in the output image dependent index dictionary 803.

When the output is to be displayed (printed) on a high quality output device, it may be desirable to use more accurate color information to determine the amounts of colorants to be used. In that case, the image with original color information rather than the indexed image would be used. In the preferred embodiment of the present invention it is also possible to obtain a less accurate, but more rapidly generated print using the indexing scheme of the present invention. To do this, the output image dependent index dictionary table is generated by calculating for each index the amounts of colorants C, M, Y, and K corresponding to the relative amounts of cyan, magenta, yellow and black needed to print on the particular printing device the color corresponding to each particular index. Please note that this colorant calculation is well known in the art.

If one is printing to a high quality printer where the slight approximation of color which occurs with the preferred embodiment of the present invention is not desirable or if more accurate colors are needed for some other reason, the original RGB color information of an image could be used as the source for the printed or processed image instead of the indexed version. In such a case, when a user desires to print or store or process a modified image, the resulting version could be the altered indexed version or, alternatively, the original RGB version could be modified and printed or stored or processed as desired. While this would take more calculations than did modifying the indexed version, modifying the full accuracy version could be done under "background" processing when the computer has the time to perform the additional calculations. Furthermore, as soon as the detailed full-accuracy calculations done under background processing are complete, the modified full-accuracy version could be re-displayed on the display screen in place of the indexed version. For instance, when the user has requested color modifications to an image which has been indexed the initial calculations would be made on the data in the image dependent index dictionary and the modified image would be displayed on the display screen. Then, whenever the user has stopped modifying the image (even if it's just for a brief moment of time of even microseconds or less) the computer would then perform the modification calculations on the full accuracy data, (RGB values in the preferred embodiment of the present embodiment, but might be in any other color space) and then display on the display screen the modified full accuracy RGB image rather than the modified indexed image. In this way, the user would be provided with the modified indexed image more quickly yet still be provided with the modified full accuracy RGB image as quickly as the computing power of the system allows.

For example, if the user wished to see what altering the hue in an indexed image would look like, the user would request this change (via cursor control, menu selections, mechanical or on-screen sliders, etc., as determined by the software and system being used) and the computer would initially display on the display screen the hue modified indexed image. Then, while the user stops to view the hue modified indexed image and to determine if any other changes should be made, rather than the computer sitting idle, the computer would instead hue modify the full-accuracy RGB values of the image and then display on the display screen the hue modified full-accuracy RGB image. Of course, if the user decided to make further modifications to the indexed image, requesting these further changes would interrupt any remaining hue calculations of the full-accuracy RGB values. In this way, the user can more quickly see the results of any requested changes yet still be able to see completely accurate representations of these changes when the user is willing to wait for the computer to complete all of the calculations on the full-accuracy RGB version of the image.

Similar steps can be performed on the screen-displayed image versus the saved image (e.g. saved on a disk drive). Stated differently, in a further embodiment of the present invention, the indexed version of an image could be used for screen display purposes while the more accurate RGB version could be used as the saved version. In other words, modifications to an image would be made to the indexed version and quickly displayed on the display screen. However, when the user decides to save a copy of the modified image then the RGB version is modified and saved. Again, this would save processing time because multiple modifications would be made on the image dependent index dictionary data values and thus avoid having to calculate all of the intermediate modifications in the full-accuracy RGB format and then when the user selects a final version to be saved the full-accuracy RGB version would be modified and saved.

Note that in the above it has been assumed that the full accuracy data is in RGB form as in the preferred embodiment of the present invention. The invention works identically using alternate embodiments where the full accuracy data is in a color space other than RGB.

The apparatus and method of the present invention can also be incorporated in image digitizers (also called image scanners). Image digitizers are used to convert images from physical form such as in transparencies and reflective prints to electronic form. Usually image digitizers convert the physical image to RGB data. In addition, using the method and or apparatus for the present invention, a modified improved image digitizer would provide both the full accuracy image data and an image dependent index dictionary for the image. This would avoid the apparatus using the data from the image digitizer having to perform the steps needed to form the image dependent index dictionary.

In a still further alternative embodiment of the present invention, various size color cubes would be used in the quantization step. In one alternative embodiment, the size of the color cubes could be user selectable. In that way if the user desired more accurate color rendering, smaller color cubes (and hence better color approximation) would be used. Conversely, if the user desired faster screen display of color modifications, larger color cubes (which would result in fewer indices) would be used. In another alternative embodiment, if a non-uniform color space is used, such as RGB or HSB, instead of a uniform color space, such as CIE-LAB, then non-symmetric color volume elements could be used to better approximate the color variations across the non-uniform color space. This could be done either experimentally in a way similar to what was done by the CIE to define its uniform color spaces where the three-dimensional color space was divided into a set of volume elements each of which is perceived by the human eye/brain combination (the CIE used many human observers in its experiments) as a different color. Alternatively, the division could be done by what is well known in the art as non-uniform optimal quantization.

Figure 9:
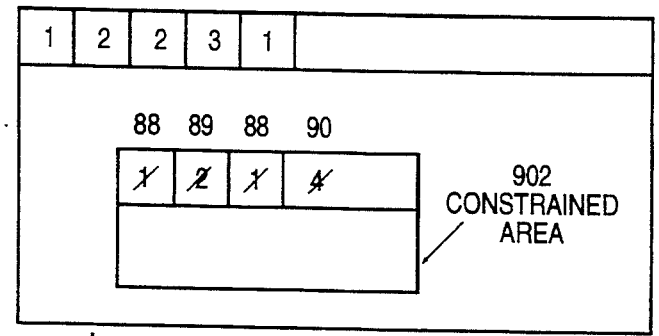
FIG. 9 depicts an image constrain operation with its associated modifications to the image dependent index dictionary.

As will be explained with reference to FIG. 9, a further embodiment of the present invention is used when a user selects a portion or subset 902 of the entire screen-displayed image 901 in order to modify just that portion 902 (in what is commonly known as a "constrain" operation, so named because any further operations are constrained to just that portion of the image).

The subset 902 can be defined geometrically by specifying a spatial region in image 901, or by color proximity by specifying a color range which forms a subset of image 901, or by both a spatial constraint and a color constraint.

It is important to note that when a constrain operation is performed and the user requests a modification to the color of that portion 902 of the image 901, if the referenced color values in the image dependent index dictionary 903 for the affected pixels were modified then all of the pixels in the image 901 which reference those color values would likewise be affected. This could have the undesired effect of modifying pixels outside the constrained portion 902. Therefore, in a further embodiment of the present invention, when a user requests a constrain operation and then requests modification or other processing of the color of the pixels within the constrain 902, a new section 905 is appended to the image dependent index dictionary 903, and all of the indices of the pixels in the constraint 902 of the indexed image 901 are copied into the appended image dependent index dictionary 905. The representative color values for the indices in the appended image dependent index dictionary 905 are obtained from the original in, age dependent index dictionary 903. New indices are then assigned to each of the entries in the appended image dependent index dictionary 905 and to the corresponding pixels within the constrain 902 of the image 901. Any color modifications to the constrain 902 are then carried out only on indices that are in the appended image dependent index dictionary 905 just as if the appended image dependent index dictionary 905 was the entire image dependent image dictionary.

In this way, whenever an image constraint is specified, index mode operations can be performed on only those pixels within the constraint without affecting the pixels outside the constraint.

Note that at the end of the constrain operation, only one image dependent index dictionary exists, consisting of the appended image dependent index dictionary 905 merged with the original image dependent index dictionary 903. Further constrain operations will further lengthen the image dependent index dictionary.

In the foregoing specification, the invention has been described with reference to a specific exemplary embodiment and alternative embodiments thereof. It will, however, be evident that various modifications and changes may be made thereto without departing from the broader spirit and scope of the invention as set forth in the appended claims. The specifications and drawings are, accordingly, to be regarded in an illustrative rather than a restrictive sense.

What is claimed is:

1. An apparatus for handling color information of an image in a digital image processing system, said image having a plurality of pixels, said apparatus comprising:
   A) means for translating the color components of the color value of each pixel in the image to the color space of a plurality of volume elements which together contain at least a portion of said color space;
   B) means for determining a representative color value for each pixel in said image, each representative color value being within a volume element of said plurality of volume elements which together contain at least a portion of said color space;
   C) means for creating a first table of representative color values, said first table consisting of at least one entry for each distinct representative color value that is determined for each pixel in said image, each entry in said first table comprising:
      i) a representative color value, and
      ii) an index value,
   such that each pixel in said image has a representative color value in an entry of said first table;
   D) means for assigning
      i) to said representative color value in said each entry of said first table, and
      ii) to said image pixels for which said representative color value is determined
         an index value in said each entry of said first table such that each distinct representative color value in said entry of said first table is assigned a unique index value;
   wherein said means for determining a representative color value for each pixel in said image and said means for assigning an index value to said representative color value of said each pixel and to said each pixel further comprises of:
   E) means for creating a base table with at least one entry per volume element of said plurality, each said entry comprising the representative color value of said volume element and an index value initially set to a unique initial value;
   F) means for translating the color components of the color value of each pixel in the image to the color space of the said base table if the color components of the color values of the pixels in said image are not in the said color space of the representative color values of the said base table;
   G) means using, for each pixel in said image, said pixel's color components in said color space to search said base table until an entry is found such that the color value of said found entry is in the same volume element in said color space as said pixel's color;
   H) means for setting, if the index value at said found entry is equal to said initial value, said index value equal to a value representing a representative color value within one of said volume elements;
   I) means for assigning said index value of said found entry in said base table to said pixel, in said image.

2. An apparatus for handling color information of an image in a digital image processing system, said image having a plurality of pixels, said apparatus comprising:
   A) means for translating the color components of the color value of each pixel in the image to the color space of a plurality of volume elements which together contain at least a portion of said color space;
   B) means for determining a representative color value for each pixel in said image, each representative color value being within a volume element of said plurality of volume elements which together contain at least a portion of said color space;
   C) means for creating a first table of representative color values, said first table consisting of at least one entry for each distinct representative color value that is determined for each pixel in said image, each entry in said first table comprising:
      i) a representative color value, and
      ii) an index value,
   such that each pixel in said image has a representative color value in an entry of said first table;
   D) means for assigning
      i) to said representative color value in said each entry of said first table, and
      ii) to said image pixels for which said representative color value is determined
         an index value in said each entry of said first table such that each distinct representative color value in said entry of said first table is assigned a unique index value;

E) means for converting each representative color value in said first table of representative color values to the corresponding representative color value such that said corresponding representative color value has color components in a different color space and such that each said corresponding representative color value of color components in a different color space represents the same color as said each representative color value.

3. An apparatus for handling color information of an image in a digital image processing system, said image having a plurality of pixels, said apparatus comprising:

A) means for translating the color components of the color value of each pixel in the image to the color space of a plurality of volume elements which together contain at least a portion of said color space;

B) means for determining a representative color value for each pixel in said image, each representative color value being within a volume element of said plurality of volume elements which together contain at least a portion of said color space;

C) means for creating a first table of representative color values, said first table consisting of at least one entry for each distinct representative color value that is determined for each pixel in said image, each entry in said first table comprising:
i) a representative color value, and
ii) an index value,
such that each pixel in said image has a representative color value in an entry of said first table;

D) means for assigning
i) to said representative color value in said each entry of said first table, and
ii) to said image pixels for which said representative color value is determined
an index value in said each entry of said first table such that each distinct representative color value in said entry of said first table is assigned a unique index value;

E) means for modifying said image by altering at least one of said representative color values in said first table of representative color values;

wherein said index value is set by count means which provides a number for said index value and wherein each pixel, said count is incremented if said index value is equal to said initial value and then said index value is set equal to the current value of said count means.

4. An apparatus for handling color information of an image in a digital image processing system, said image having a plurality of pixels, said apparatus comprising:

A) means for translating the color components of the color value of each pixel in the image to the color space of a plurality of volume elements which together contain at least a portion of said color space;

B) means for determining a representative color value for each pixel in said image, each representative color value being within a volume element of said plurality of volume elements which together contain at least a portion of said color space;

C) means for creating a first table of representative color values, said first table consisting of at least one entry for each distinct representative color value that is determined for each pixel in said image, each entry in said first table comprising:
i) a representative color value, and
ii) an index value,
such that each pixel in said image has a representative color value in an entry of said first table;

D) means for assigning
i) to said representative color value in said each entry of said first table, and
ii) to said image pixels for which said representative color value is determined
an index value in said each entry of said first table such that each distinct representative color value in said entry of said first table is assigned a unique index value;

wherein said means for determining a representative color value and said means for assigning together create a second table comprising a second plurality of entries, each entry comprising for a particular pixel in said image the index value assigned to the representative color value of the color value element which contains the color value of said particular pixel.

5. A method of processing color information of an image in an image processing system, said image having a plurality of pixels, said method comprising:

A) determining a representative color value for each pixel in said image such that a first plurality of representative color values is determined, at least one pixel in said plurality of pixels having a color value which is not equal to its representative color value in said first plurality of representative color values;

B) providing an index value for each pixel in said image, each index value representing a particular representative color value in said first plurality of representative color values;

C) processing said image by modifying said first plurality of representative color values;

wherein said step of processing said image comprises modifying at least one of representative color values in said first plurality of representative color values and wherein said representative color value for each pixel is determined by a predetermined number of most significant bits of each component of the color value of said each pixel, wherein processing said image by modifying said first plurality of representative color values provides a modified first plurality of representative color values, D) displaying said image as modified by using the index value for a particular pixel to obtain the corresponding modified representative color value for said particular pixel, wherein said image has color values comprising a first data set, said first data set containing more color values than said first plurality of representative color values, the color value in said first data set for said particular pixel being used to determine the representative color value for said particular pixel, said method further comprising modifying said color values of said first data set to provide a modified first data set after said step of displaying said image as modified by using the index value for said particular pixel.

6. A method as in claim 5 further comprising displaying the image which results from said modified first data set.

7. A method of handling color information an image in a digital image processing system, said image having a plurality of pixels, said method comprising:

A) providing a plurality of color volume elements which together contain at least a portion of a color space, each of
said volume elements having a representative color value such that a first plurality of representative color values are provided;

B) determining a representative color value for each pixel in said image;

C) assigning an index value to each representative color value that is determined for each pixel in said image such that each distinct representative color value that is determined for each pixel in said image is assigned a unique index value, and such that a subset of said first pluraltiy of representative color values is determined, each representative color value in said subset having an assigned index value, and each pixel in said image having a representative color value in said subset; and wherein said step of determining a representative color value and said step of assigning an index value together create a data set comprising a plurality of entries, each entry comprising for a particular pixel in said image the index value assigned to the representative color value of the color volume element which contains the color value of said particular pixel.

8. A method of handling color information of an image in a digital image processing system, said image having a plurality of pixels, said method comprising:

A) providing a plurality of color volume elements which together contain at least a portion of a color space, each of
said volume elements having a representative color value such that a first plurality of representative color values are provided;

B) determining a representative color value for each pixel in said image;

C) assigning an index value to each representative color value that is determined for each pixel in said image such that each distinct representative color value that is determined for each pixel in said image is assigned a unique index value, and such that a subset of said first pluraltiy of representative color values is determined, each representative color value in said subset having an assigned index value, and each pixel in said image having a representative color value in said subset;

wherein said step of determining a representative color value for each pixel in said image and said step of assigning an index value for each representative color value that is determined for each pixel in said image such that said subset is determined, comprises:

A) creating a first table with at least one entry per volume element of said plurality of color volume elements, each said entry comprising the representative color value of said volume element and an index value initially set to a unique initial value;

B) if the color components of the color values of the pixels in said image are not in the said color space of the representative color values of the said first table, translating the color components of the color value of each pixel in the image to the color space of said first table;

C) for each pixel in said image, using said pixel's color component in said color space to search said first table until an entry is found such that the color value of said found entry is in the same volume element in said color space as said pixel's color, such that:

i) if the index value at said found entry is equal to said initial value, setting said index value equal to a value representing a representative color value within one of said volume elements, and ii) assigning said index value of said found entry in said first table to said pixel in said image;

D) creating a second table each entry in said second table comprising:
i) one said index value, and
ii) the said representative color value in said color space volume element associated with said index value in said first table.

9. The color information handling method of claim 8 wherein said index value is set by a count which provides an number for said index value and wherein for each pixel, said count is incremented if said index value is equal to said initial value and then said index value is set equal to the current value of said count.

10. An apparatus for handling color information of an image in a digital image processing system, said image having a plurality of pixels, said apparatus comprising:

A) means for translating the color components of the color value of each pixel in the image to the color space of a plurality of volume elements which together contain at least a portion of said color space;

B) means for determining a representative color value for each pixel in said image, each representative color value being within a volume element of said plurality of volume elements which together contain at least a portion of said color space;

C) means for creating a first table of representative color values, said first table consisting of at least one entry for each distinct representative color value that is determined for each pixel in said image, each entry in said first table comprising:
i) a representative color value, and
ii) an index value,
such that each pixel in said image has a representative color value in an entry of said first table;

D) means for assigning
i) to said representative color value in said each entry of said first table, and
ii) to said image pixels for which said representative color value is determined
an index value in said each entry of said first table such that each distinct representative color value in said entry of said first table is assigned a unique index value;

E) means for modifying said image by altering at least one of said representative color values in said first table of representative color values, wherein said means for modifying provides a modified first table of representative color values;

F) means for displaying said image as modified by using the index value for a particular pixel to retrieve the corresponding modified representative color value for said particular pixel,
wherein said image has color values comprising a first data set, said first data set containing more color values than said first table and the color value in said first data set for said particular pixel being used to determine the representative color value for said particular pixel, said apparatus further comprising means for modifying said color values of said first data set to provide a modified first data set after said step of displaying said image as modified by using the index value for said particular pixel.

11. An apparatus as in claim 10 wherein said means for displaying displays the image which results from said modified first data set.

12. An apparatus as in claim 10 wherein said means for providing an index value for each pixel provides an indexed image and said apparatus further comprising of means for storing said indexed image.

13. An apparatus for handling color information of an image in a digital image processing system, said image having a plurality of pixels said apparatus comprising:
   A) means for translating the color components of the color value of each pixel in the image to the color space of a plurality of volume elements which together contain at least a portion of said color space;
   B) means for determining a representative color value for each pixel in said image, each representative color value being within a volume element of said plurality of volume elements which together contain at least a portion of said color space;
   C) means for creating a first table of representative color values, said first table consisting of at least one entry for each distinct representative color value that is determined for each pixel in said image, each entry in said first table comprising:
      i) a representative color value, and
      ii) an index value,
      such that each pixel in said image has a representative color value in an entry of said first table;
   D) means for assigning
      i) to said representative color value in said each entry of said first table, and
      ii) to said image pixels for which said representative color value is determined
         an index value in said each entry of said first table such that each distinct representative color value in said entry of said first table is assigned a unique index value;
   means for reindexing a selected set of pixels of said image said means for reindexing comprising:
   E1) means for assigning a new index value to said pixel in said selected set, and
   E2) means for adding to said first table of representative color values an entry comprising:
      i) said new index value, and
      ii) the representative color value of the entry which corresponds in said table to said pixel in said selected set prior to said pixel being reindexed.

14. The color information handling apparatus of claim 13, wherein modifications to said selected set of pixels are made by replacing in said first table of representative color values said representative color values of said selected pixels with other representative color values.

15. A Method of handling color information an image in a digital image processing system, said image having a plurality of pixels, said method comprising:
   A) providing a plurality of color volume elements which together contain at least a portion of a color space, each of
      said volume elements having a representative color value such that a first plurality of representative color values are provided;
   B) determining a representative color value for each pixel in said image;
   C) assigning an index value to each representative color value that is determined for each pixel in said image such that each distinct representative color value that is determined for each pixel in said image is assigned a unique index value, and such that a subset of said first pluraltiy of representative color values is determined, each representative color value in said subset having an assigned index value, and each pixel in said image having a representative color value in said subset;
   D) creating a table having entries, each entry in said table comprising:
      i) one said index value and
      ii) the representative color value in said color space volume element associated with said index value in said subset.

16. A method as in claim 15 further comprising converting each representative color value in said subset of representative color values to the corresponding representative color value such that said corresponding representative color value has color components in a different color space and such that each said corresponding representative color value of color components in a different color space represents the same color as said each representative color value.

17. A method as in claim 15 wherein said step of providing a plurality of color volume elements comprises creating a first table containing a first plurality of entries, wherein each entry in said first table contains an index value and the color parameters of a representative color value of one of said color volume elements.

18. The color information handling method of claim 15 wherein said color space is a substantially uniform color space.

19. The color information handling method of claim 15 wherein the size of said volume element is user selectable.

20. The color information handling method of claim 15 wherein said volume element is a cuboid.

21. The color information handling method of claim 20 wherein said cuboid has four color points per edge.

22. A method as in claim 15 wherein said method is performed partially in an image digitizer for digitizing an image such that said image digitizer performs the steps of determining a representative color value and providing an index value.

23. A method as in claim 16 wherein said representative color value for each pixel is determined by a predetermined number of most significant bits of each component of the color value of said each pixel.

24. A method as in claim 23 wherein said color value has three color components and wherein said predetermined number of most significant bits is different for at least one of said three color components and wherein at least one pixel in said plurality of pixels has a color value which is not equal to its representative color value in said subset of representative color values.

25. The color information handling method of claim 23 wherein said representative color value being determined by a predetermined number of most significant bits results in a truncated color value and wherein said truncated color value is sued as an address to obtain the representative color value for each pixel from a table containing said first plurality of representative color values.

26. The color information handling method of claim 15 further comprising the step of modifying said image by altering at least one of representative color values in said subset of representative color values.

27. A method as in claim 26 wherein said modifying said image by modifying said subset provides a modified subset of representative color values and said method further comprising displaying said image as modified by using the index value for a particular pixel to retrieve the corresponding modified representative color value for said particular pixel.

28. A method as in claim 27 wherein said image has color values comprising a first data set, said first data set containing more color values than said subset and the color value in said first data set for said particular pixel being used to determine the representative color value for said particular pixel, said method further comprising modifying said color values of said first data set to provide a modified first data set after said step of displaying said image as modified by using the index value for said particular pixel.

29. A method as in claim 28 further comprising displaying the image which results from said modified first data set.

30. A method as in claim 27 wherein said step of providing an index value for each pixel provides an indexed image and said method further comprising storing said indexed image.

31. A method as in claim 26 wherein said step of modifying said image comprises modifying said subset of representative color values to produce a second subset of representative color values, and wherein each index value represents a particular representative color value in said second subset of representative color values.

32. The color information handling method of claim 15 further comprising the step of modifying said image by altering at least one of representative color values in said subset of representative color values.

33. A method as in claim 32 wherein said modifying said image by modifying said subset provides a modified subset of representative color values and said method further comprising displaying said image as modified by using the index value for a particular pixel to retrieve the corresponding modified representative color value for said particular pixel.

34. A method as in claim 33 wherein said image has color values comprising a first data set, said first data set containing more color values than said subset and the color value in said first data set for said particular pixel being used to determine the representative color value for said particular pixel, said method further comprising modifying said color parameter values of said first data set to provide a modified first data set after said step of displaying said image as modified by using the index value for said particular pixel.

35. A method as in claim 34 further comprising displaying the image which results from said modified first data set.

36. The color information handling method of claim 15, further comprising reindexing a selected set of pixels of said image by, for each pixel in the selected set to be reindexed:
A) assigning a new index value to said pixel in said selected set, and
B) adding to said subset an entry comprising:
  i) said new index value, and
  ii) the representative color value of the entry which corresponds in said table to said pixel in said selected set prior to said pixel being reindexed.

37. The color information handling method of claim 36, wherein modifications to said selected set of pixels are made by replacing in said subset of representative color values said representative values of said selected pixels with other representative color values.

38. A method as in claim 31 wherein each representative color value in said second subset of representative color values is a set of colorant values which corresponds to a pre-calculated color separation based on an associated representative color value in said first plurality of representative color values.

39. A method as in claim 38 wherein each of said set of colorant values represents cyan, magenta, yellow and black colorants.

40. A method as in claim 38 further comprising printing said image using said second plurality of representative color values.

41. An apparatus for handling color information of an image in a digital image processing system, said image having a plurality of pixels, said apparatus comprising:
A) means for translating the color components of the color value of each pixel in the image to the color space of a plurality of volume elements which together contain at least a portion of said color space;
B) means for determining a representative color value for each pixel in said image, each representative color value being within a volume element of said plurality of volume elements which together contain at least a portion of said color space;
C) means for creating a first table of representative color values, said first table consisting of at least one entry for each distinct representative color value that is determined for each pixel in said image, each entry in said first table comprising:
  i) a representative color value, and
  ii) an index value,
  such that each pixel in said image has a representative color value in an entry of said first table;
D) means for assigning
  i) to said representative color value in said each entry of said first table, and
  ii) to said image pixels for which said representative color value is determined
    an index value in said each entry of said first table such that each distinct representative color value in said entry of said
E) means to obtain a predetermined number of most significant bits of each component of the color value of said each pixel and
F) means to determine said representative color value for each pixel from said predetermined number of most significant bits of each component of the color value of said each pixel.

42. An apparatus as in claim 41 wherein said apparatus includes an image digitizer for digitizing an image.

43. The color information handling apparatus of claim 41 wherein means to determine said representative color value for each pixel from said predetermined number of most significant bits of each component of the color value of said each pixel further comprises of means to search a table containing the representative color values of said plurality of volume elements which together contain at least a portion of a color space.

44. The color information handling apparatus of claim 41 wherein said color space is a substantially uniform color space.

45. The color information handling apparatus of claim 41 wherein the size of said volume element is user selectable.

46. The color information handling apparatus of claim 41 further comprising means for modifying said image by altering at least one of representative color values in said first table of representative color values.

47. An apparatus as in claim 46 wherein said means for modifying said image by modifying said first table of representative color values provides a modified first table of representative color values and said apparatus further comprising means for displaying said image as modified by using the index value for a particular pixel to retrieve the corresponding modified representative color value for said particular pixel.

48. An apparatus as in claim 46 wherein said means for modifying said image comprises means for modifying said first table of representative color values to produce a third table of representative color values, and wherein each index value represents a particular representative color value in said third table of representative color values.

49. An apparatus as in claim 48 wherein each representative color value in said third table of representative color values is a set of colorant values which corresponds to a pre-calculated color separation based on an associated representative color value in said first plurality of representative color values.

50. An apparatus as in claim 49 wherein each of said set of colorant values represents cyan, magenta, yellow and black colorants.

51. The color information handling apparatus of claim 41 wherein said volume element is a cuboid.

52. The color information handling apparatus of claim 51 wherein said cuboid has four color points per edge.

* * * * *